(12) United States Patent
Henning et al.

(10) Patent No.: US 12,104,665 B2
(45) Date of Patent: Oct. 1, 2024

(54) DISC BRAKE HAVING AN ELECTROMECHANICAL ACTUATOR

(71) Applicant: WABCO Europe BVBA, Brussels (BE)

(72) Inventors: Paul Henning, Schwetzingen (DE); Bartlomiej Tomala, Opole (PL)

(73) Assignee: ZF CV Systems Europe BV, Brussels (BE)

( * ) Notice: Subject to any disclaimer, the term of this patent is extended or adjusted under 35 U.S.C. 154(b) by 1078 days.

(21) Appl. No.: 16/998,011

(22) Filed: Aug. 20, 2020

(65) Prior Publication Data

US 2021/0054888 A1 Feb. 25, 2021

(30) Foreign Application Priority Data

Aug. 22, 2019 (EP) .................................... 19193161

(51) Int. Cl.
| | | |
|---|---|---|
| *F16D 55/2255* | (2006.01) | |
| *F16D 65/02* | (2006.01) | |
| *F16D 65/095* | (2006.01) | |
| *F16D 65/18* | (2006.01) | |
| *F16D 121/20* | (2012.01) | |
| *F16D 125/28* | (2012.01) | |

(52) U.S. Cl.
CPC ....... *F16D 55/2255* (2013.01); *F16D 65/028* (2013.01); *F16D 65/095* (2013.01); *F16D 65/18* (2013.01); *F16D 2065/022* (2013.01); *F16D 2121/20* (2013.01); *F16D 2125/28* (2013.01)

(58) Field of Classification Search
CPC .... F16D 55/2255; F16D 65/14; F16D 65/028; F16D 65/092; F16D 65/095; F16D 65/18; F16D 65/0043; F16D 2121/20; F16D 2121/24; F16D 2125/32
See application file for complete search history.

(56) References Cited

U.S. PATENT DOCUMENTS 4,295,548 A * 10/1981 Quiney ................. F16D 65/567
188/348
11,345,325 B2 * 5/2022 Henning ................. F16D 65/18
(Continued)

FOREIGN PATENT DOCUMENTS

DE 19506955 C1 * 6/1996 ............ B60T 17/083
DE 102012006090 A1 9/2013
(Continued)

*Primary Examiner* — Vishal R Sahni
(74) *Attorney, Agent, or Firm* — Dickinson Wright PLLC (57) ABSTRACT

The present disclosure relates to a disc brake having an electromechanical actuator for vehicles, in particular for utility vehicles, comprising a brake disc, a brake carrier and a brake caliper of a vehicle for applying the brake disc by means of brake linings. Current tests have shown that the tappet after assembly is not fixed correctly in a housing of the electromechanical actuator. The tappet may after positioning fall out of the rotary lever, which results in the force transmission for applying the brake disc being interrupted and the brake disc not being able to be applied. An object of the present disclosure is to overcome the problems from the prior art and to provide a disc brake with an electromechanical actuator which reduces or even prevents damage to the tappet, the cam disc and the housing of the electromechanical actuator.

17 Claims, 5 Drawing Sheets

(56) References Cited

U.S. PATENT DOCUMENTS

| | | | |
|---|---|---|---|
| 2017/0067522 A1* | 3/2017 | Banks | F16D 65/183 |
| 2019/0024740 A1* | 1/2019 | Taylor | F16D 65/52 |
| 2019/0063530 A1* | 2/2019 | Kulkarni | F16D 55/227 |
| 2020/0309262 A1* | 10/2020 | Kirchner | B60T 1/062 |
| 2021/0054888 A1* | 2/2021 | Henning | F16D 65/028 |

FOREIGN PATENT DOCUMENTS

| | | | | |
|---|---|---|---|---|
| DE | 102016210757 B3 * | 6/2017 | | B60T 1/005 |
| DE | 102016207237 A1 * | 11/2017 | | |
| DE | 102017004436 A1 * | 11/2018 | | B60T 13/74 |
| EP | 2239480 A1 | 10/2010 | | |
| EP | 2474754 A1 * | 7/2012 | | F16D 65/18 |
| JP | 3774003 B2 | 5/2006 | | |
| WO | WO-2018206204 A1 * | 11/2018 | | B60T 13/74 |

\* cited by examiner

DISC BRAKE HAVING AN ELECTROMECHANICAL ACTUATOR

TECHNICAL FIELD

The present disclosure relates to a disc brake having an electromechanical actuator for vehicles, in particular for utility vehicles, comprising a brake disc, a brake carrier and a brake caliper of a vehicle for applying brake linings to the brake disc. The electromechanical actuator comprises a motor, a cam disc which is constructed as a force transmission device and a tappet which is constructed as an adjustment unit.

BACKGROUND

Electromechanical actuators for applying brake linings for disc brakes are sufficiently known. The adjustment unit is electrically driven by a motor, which is coupled to the adjustment unit via the force transmission device. The force transmission device may be a cam disc which converts a rotational movement of the motor into a translational movement. The translational movement, also known as a linear movement, is transmitted by a tappet which is operationally connected to the cam disc to a rotary lever of the disc brake. The rotary lever tensions the brake disc during a braking operation via a pressure piece and the brake linings. In current solutions, the tappet is not securely fixed in a housing of the electromechanical actuator after assembly, for which reason the tappet, after positioning, might fall out of the rotary lever, resulting in the force transmission for applying the brake disc being interrupted and the brake disc not being able to be applied.

SUMMARY

An object of the present disclosure is to overcome the problems from the prior art and to provide a disc brake with an electromechanical actuator which reduces or even prevents damage to the tappet, the cam disc and the housing of the electromechanical actuator.

According to the present disclosure, a cam disc of an electromechanical actuator of a disc brake has a stop and the stop is configured to fix the tappet in a starting position of the rotary lever, in the direction of an axial axis of the electromechanical actuator, in the opposite direction to the cam disc. The starting position of the rotary lever is intended to be the position in which no braking is initiated by the driver. Or, in other words, no force and consequently no torque is applied to the rotary lever of the disc brake. The stop clamps the rotary lever in the cam disc, wherein the stop has two properties. On the one hand, the stop prevents an axial movement in the direction of the rotary lever. On the other hand, the stop acts as a support for the rotary lever so that the rotary lever and a guide of the electromechanical actuator are arranged axially in a plane and the stop together with another stop on the actuator housing prevents a rotational movement about the individual axis of the rotary lever.

In another embodiment, the electromechanical actuator has a gap between a guide region of the tappet, in order to guide the tappet along the axial axis, and a first inner wall of the guide region of the actuator housing, and the gap is configured so that the tappet, starting from the starting position of the rotary lever, can be moved in a range between 0° and 5°, in a particularly advantageous manner between 0° and 3°, about a tappet axis. The tappet is, on the one hand, arranged in the cam disc. On the other hand, the tappet has as far as the first inner wall of the guide region of the actuator housing a gap between 0° and 5°. The advantage is that the tappet remains in the installation position, that is to say, it cannot fall out of the cam disc. At the same time, the gap prevents the tappet from becoming jammed in the guide, initiated by tolerances in the width of the guide which occur during the production process.

In another embodiment, the stop has an abutment face radially in the direction of the tappet. The tappet is in abutment with the abutment face in the starting position of the rotary lever. The abutment face facilitates the assembly of the tappet, in particular the arrangement of the tappet in a receiving member of the rotary lever. More specifically, the tappet cannot tilt radially away, but instead remains axially in position so that the rotary lever during the assembly can be readily arranged in the receiving member of the tappet.

In addition, the guide region of the actuator housing has at the end face, with respect to the axial axis, a second inner wall. The tappet is in abutment in the starting position of the tappet with the second inner wall of the guide region of the actuator housing. The tappet is in the starting position thus clamped axially between the stop and the second inner wall of the guide region.

An incorrect position of the tappet after assembly, that is to say, when the tappet is not arranged in the receiving member of the rotary lever, is prevented with the positioning of the tappet on the abutment face and the positioning of the tappet on the second inner wall of the guide face. The tappet does not become jammed between the rotary lever and the cam disc, and the cam disc and the housing of the electromechanical actuator are not damaged by the tappet.

In a development, the tappet has a guide roller and a lever arm which is arranged axially in the direction of the rotary lever of the disc brake, wherein the lever arm in the starting position of the rotary lever is in abutment with the abutment face. The guide roller guides the rotary lever along the cam disc and the lever arm acts as a connecting link between the guide roller of the tappet and the rotary lever of the disc brake.

It has further been found to be advantageous in another embodiment for the cam disc to be constructed in a helical manner and for the stop to be arranged radially at an outer end of the cam disc. The cam disc is arranged via a shaft with a drive of the electromechanical actuator in the housing of the electromechanical actuator. Between the stop and the shaft, the cam disc has a recess for receiving the guide roller of the tappet. Or, in other words, the stop is a radially extending attachment on the outer side of the cam disc, and the radial attachment and the side of the cam disc opposite the radial attachment form a trough for receiving the tappet.

In an alternative second embodiment, a spring surrounds the tappet. The spring is arranged axially with a first end stop on the actuator housing. In addition, the spring is axially arranged with a second end stop on the tappet. The spring is in turn configured to fix the tappet axially and radially in a starting position of the rotary lever. The alternative embodiment makes use of the knowledge that the spring acts as a guide for the tappet and prevents falling out of the cam disc and at the same time is variable in such a manner that the spring permits an axial movement of the tappet in order to activate the rotary lever of the disc brake.

For correct positioning of the spring in the actuator housing, a development of the second embodiment has a spring receiving member for supporting the first end stop of the spring in an axial direction. The spring receiving member is arranged in the guide of the housing and in front of the rotary lever of the disc brake. The spring is a pressure spring, wherein the pressure spring is axially and radially supported on the spring receiving member.

In another configuration of the second embodiment, the spring receiving member is a spring plate. The spring plate centrally has an opening for guiding through the lever arm of the tappet.

The actuator housing, to which the spring receiving member is secured, is in an advantageous development of the second embodiment an aluminum housing. Inter alia, an aluminum housing is light and readily deformable compared with a cast steel. With an aluminum housing, it is possible for the guide to be able to be readily adapted to the diameter of the spring receiving member with a processing tool. A post-processing of the guide, for example, with a milling tool, in order to arrange the spring receiving member is also possible.

In a third embodiment, the electromechanical actuator of the disc brake, tangentially along the tappet, has a first spring and opposite the first spring, tangentially along the tappet, a second spring, wherein the first spring and the second spring are configured to retain the tappet axially and radially in a starting position of the rotary lever. In other words, at each of the axial sides of the tappet there is arranged a respective spring, which retain the tappet in position. The first spring and the second spring may be produced from a metal material or a plastics material.

In a development of the third embodiment, a guide roller of the tappet, with respect to the axial axis, vertically has a first receiving bearing for fixing an end stop of the first spring. Furthermore, the guide roller, with respect to the axial axis, vertically has a second receiving bearing for fixing an end stop of the second spring. The second receiving bearing is arranged axially parallel with the first receiving bearing. The tappet is arranged between the first receiving bearing and the second receiving bearing. The tappet with the guide roller can be moved independently of the first receiving bearing and the second receiving bearing. The first receiving bearing and the second receiving bearing are axially and radially immovable.

In another embodiment of the third development, the electromechanical actuator has a first spring retention element for receiving the end stop of the first spring. In addition, the electromechanical actuator has a second spring retention element for receiving the end stop of the second spring. Both the first spring retention element and the second spring retention element serve to axially tension the first spring and the second spring and to retain the tappet in position against falling out of the cam disc.

In an advantageous configuration of the third embodiment, the first spring retention element is radially fixed to a first inner wall of the guide region of the actuator housing and the second spring retention element is radially fixed to the first inner wall of the guide region of the actuator housing. For positioning, the first spring retention element is inserted radially into a groove of the guide of the electromechanical actuator and, for positioning, the second spring retention element is also inserted radially into a groove of the guide of the electromechanical actuator.

In addition, in another configuration of the third embodiment, it has been found to be advantageous for the first spring retention element to be fixed by a first screw connection and a first tongue-and-groove connection to the first inner wall of the guide region of the actuator housing and for the second spring retention element to be fixed by a second screw connection and a tongue-and-groove connection to the first inner wall of the guide region of the actuator housing.

After the positioning of the first spring retention element and the second spring retention element, the first spring retention element is subsequently axially secured to the housing of the electromechanical actuator in a non-positive-locking manner by the first screw connection and the second spring retention element is axially secured to the housing of the electromechanical actuator in a non-positive-locking manner by the second screw connection. Both the first screw connection prevents a torsion of the first spring retention element about the axial axis and the second screw connection prevents a torsion of the second spring retention element about the axial axis.

In a last development, the actuator housing is an aluminum housing. Aluminum housings are light and can be readily deformed with a processing tool.

Selected embodiments of the present disclosure are explained below with reference to the appended Figures. The drawings are provide herewith for purely illustrative purposes and are not intended to limit the scope of the present invention.

BRIEF DESCRIPTION OF THE DRAWINGS

In the drawings:

FIG. 3 is a detailed view of a second embodiment of the electromechanical actuator of the disc brake according to FIGS. 1 to 2a, FIG. 4 is a detailed view of a third embodiment of the electromechanical actuator of the disc brake according to FIGS. 1 to 2a.

DETAILED DESCRIPTION OF THE DRAWINGS

Figure 1:
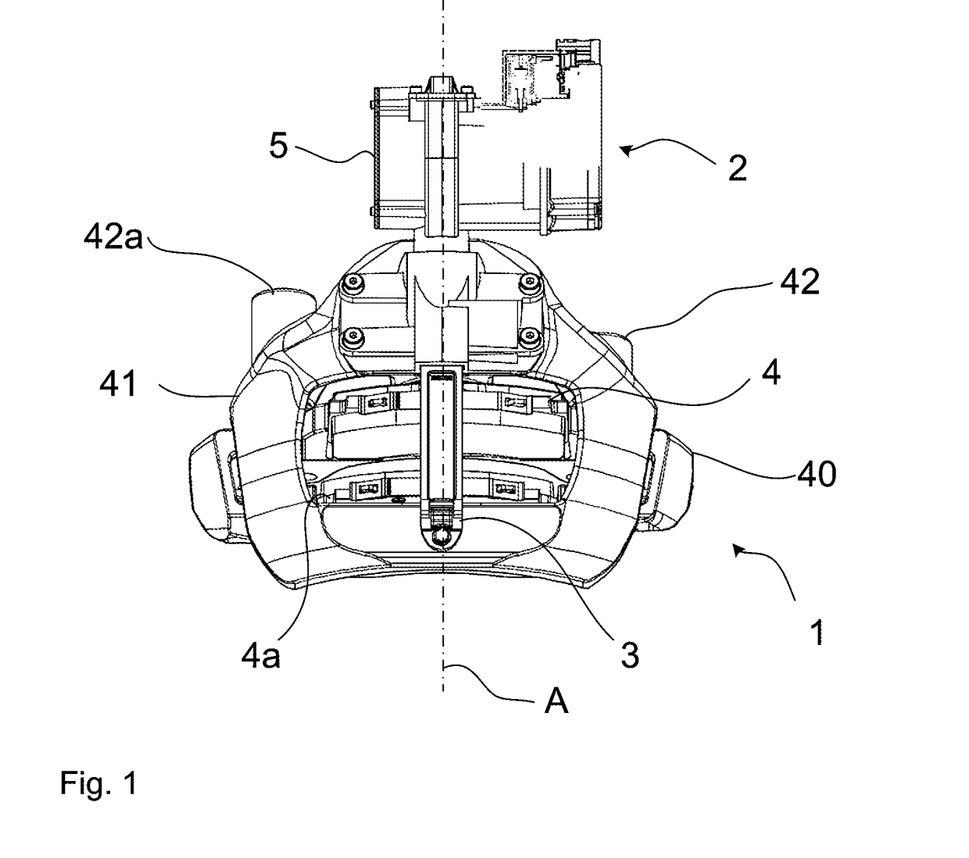
FIG. 1 is a plan view of a disc brake having an electromechanical actuator.

FIG. 1 shows a disc brake 1 having an electromechanical actuator 2, wherein the electromechanical actuator 2 has an actuator housing 5. The electromechanical actuator 2 is flange-mounted on the disc brake 1 along an axial axis A. The disc brake 1 has two brake linings 4, 4a which are retained against radially falling out by a curved holding-down member 3. In addition, the disc brake 1 is subdivided into a brake carrier 40 for receiving the brake linings 4, 4a and a brake caliper 41, wherein the brake caliper 41 is supported by two guide pins 42, 42a in an axially sliding manner on the brake carrier 40. During a braking operation, the electromechanical actuator 2 applies a brake disc 46 (FIG. 2) via the brake linings 4, 4a, a pressure piece which is not shown and a rotary lever 7 which is shown in FIG. 2a.

Figure 2:
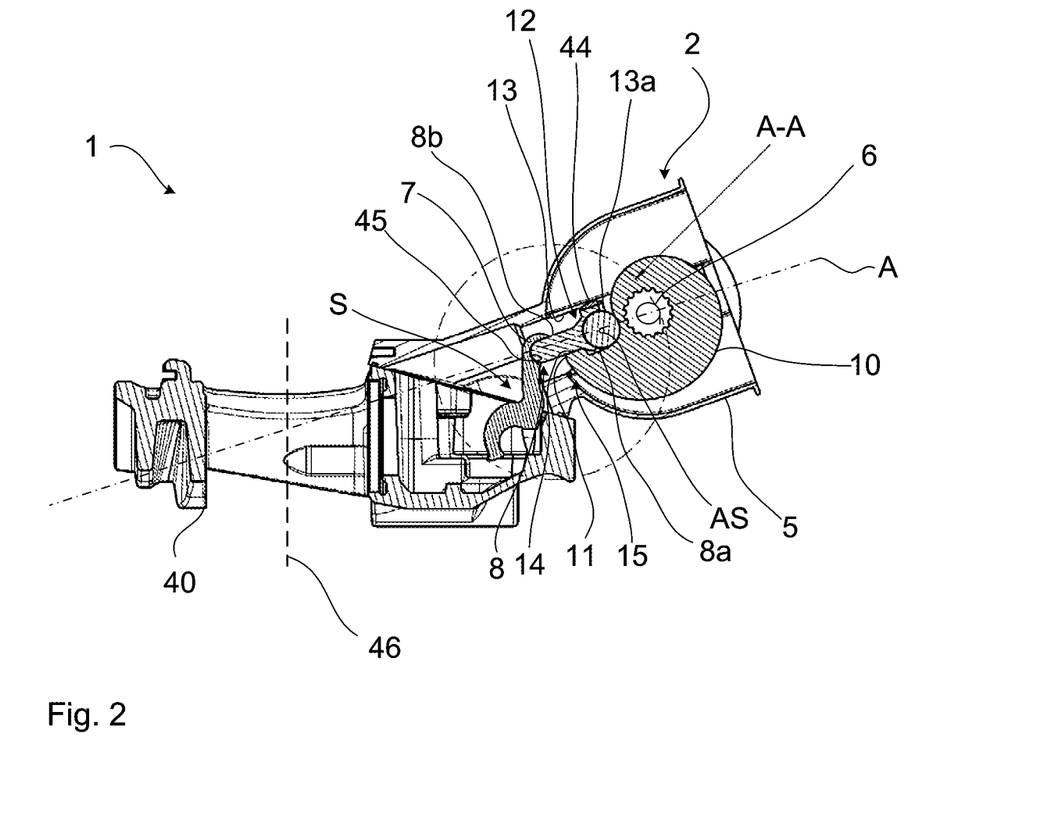
FIG. 2 is a laterally sectioned view of a disc brake having an electromechanical actuator according to FIG. 1.

FIG. 2 shows in detail how the electromechanical actuator 2 according to FIG. 1 is constructed. In the electromechanical actuator 2, a cam disc 10 is arranged via a shaft 6, wherein the cam disc 10 is orientated along the axial axis A and can be moved in rotation about the shaft 6. The actuator housing 5 internally has a cylindrical guide region 12 for guiding a tappet 8 along the axial axis A. The tappet 8 is arranged between a first inner wall 13 of the guide region 12, a second inner wall 13a of the guide region 12 arranged at the end and the cam disc 10, wherein a lever arm 8b of the tappet 8 is arranged only partially between the first inner wall 13 of the guide region 12 and the cam disc 10 and the lever arm 8b is positioned radially on an abutment face 14 of a stop 11 of the cam disc 10, that is to say, it is supported radially on the stop 11. The stop 11 is arranged at an outer end 15 of the cam disc 10. The cam disc 10 and the stop 11 are one component. The tappet 8 is axially delimited by the second inner wall 13a of the guide region 12 and the stop 11. The tappet 8 additionally has a guide roller 8a for guiding the tappet 8 along the cam disc 10. The guide region 12 is geometrically configured in a radial direction in such a manner that the tappet 8 in a zero position has a limited movement play about a tappet axis AS. The starting position S of the tappet 8 is defined as a zero position, wherein no braking operation, that is to say, an application of the brake disc 46 via the brake linings 4, 4a, is carried out. In order to implement the limited movement play of the tappet 8, the tappet 8 is positioned, on the one hand, radially on the cam disc 10. On the other hand, a gap L (FIG. 2a) between a sliding chamfer 44 of the tappet 8 and the first inner wall 13 of the guide region 12 of the actuator housing 5 is so small that the tappet 8 in the zero position has a movement play about a tappet axis AS of a maximum of 3°, whereby a jamming of the tappet 8 is counteracted.

Figure 2A:
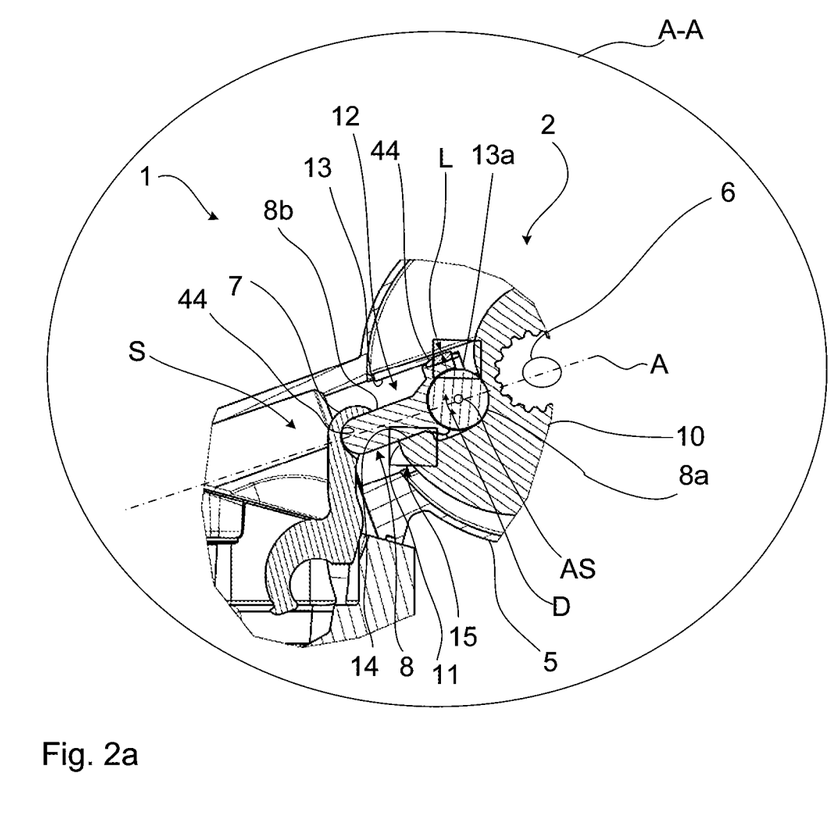
FIG. 2a shows a cut-out of the electromechanical actuator according to FIG. 2 with a rotary lever of the disc brake according to FIG. 1.

The gap L between the guide region 12 and the tappet 8 of the electromechanical actuator 2 according to FIGS. 1 and 2 is shown again in detail in FIG. 2a. Furthermore, in FIG. 2a, the rotary lever 7 of the disc brake 1 according to FIG. 1 is shown. The rotary lever 7 is located in a starting position S. The positioning of the tappet 8 in the starting position S of the rotary lever 7 is particularly clear. The tappet 8 is supported axially with the lever arm 8a in a receiving member 45 of the rotary lever 7. As described in FIG. 2, the stop 11 of the cam disc 10 secures the tappet 8 against undesirable rotation movement D of the rotary lever 7 and the associated falling out of the tappet 8.

Figure 3:
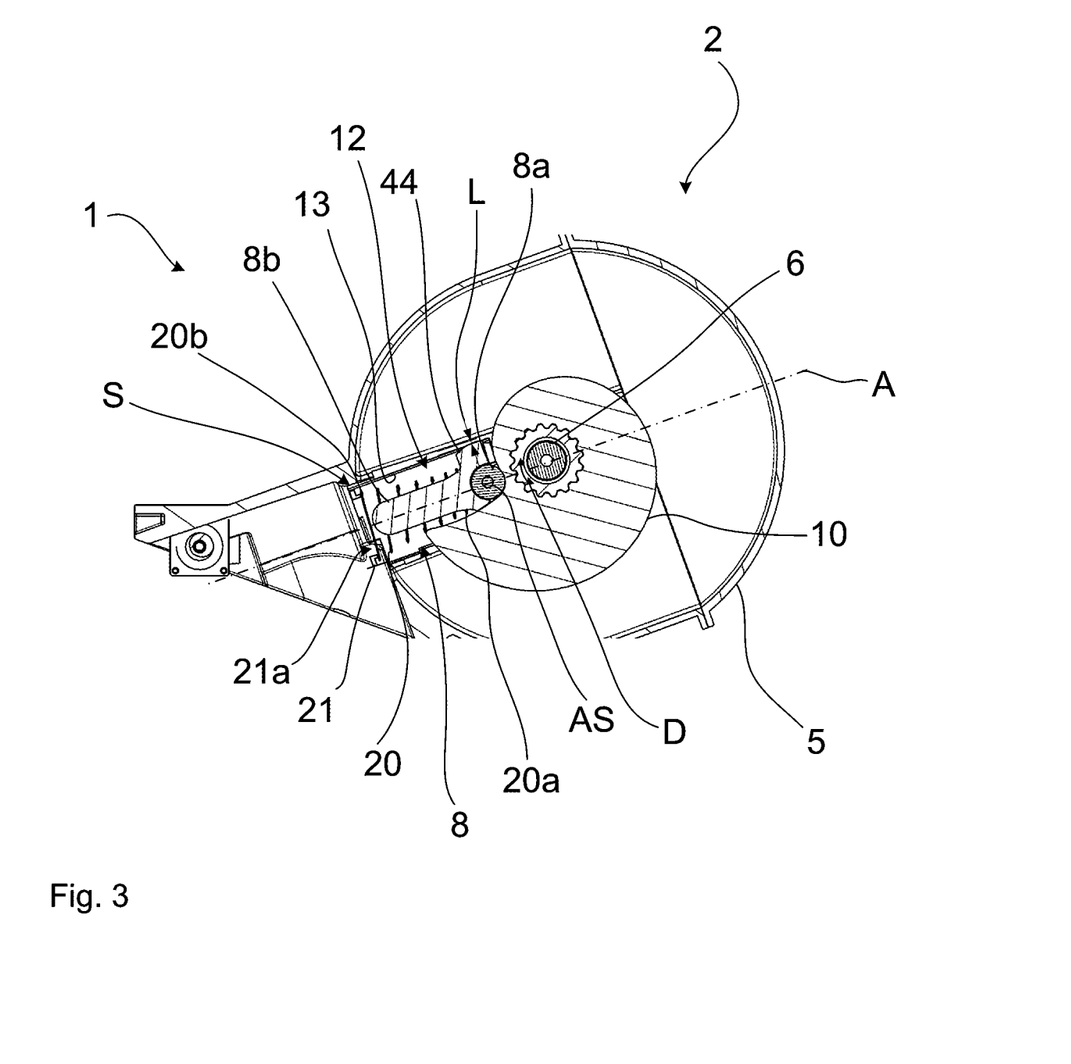

Alternatively, the tappet 8 in a second embodiment according to FIG. 3 may be retained in position by a spring 20. FIG. 3 shows the position of the tappet 8 and the spring 20 in the starting position S of the rotary lever 7 (FIG. 2a). The spring 20 is axially secured by a first end stop 20a to a spring receiving member 21. The spring receiving member 21 which is constructed as a disc spring is supported radially on the first inner wall 13 of the guide region 12 of the actuator housing 5. In addition, the spring receiving member 21 has an opening 21a for guiding the lever arm 8a of the tappet 8 through axially. The spring 20 is pushed axially over the tappet 8 and is supported with a second end stop 20b axially and radially on the lever arm 8b of the tappet 8. The tappet 8 is prevented from axially falling out since the spring 20 during an axial movement of the tappet 8 in the direction of the rotary lever 7 (FIG. 2a) applies an axial counter-force in the direction of the cam disc 10 and prevents torsion of the tappet 8 about the tappet axis AS.

Figure 4:
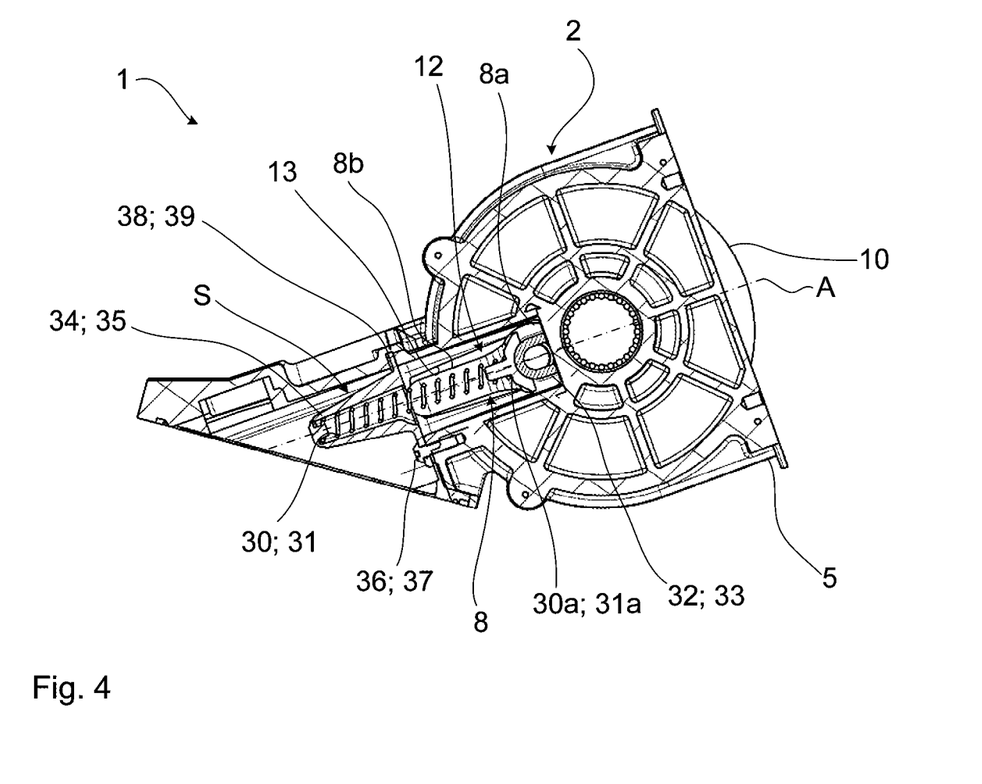

Another possibility for positioning the tappet 8 of the electromechanical actuator 2 of the disc brake 1 according to FIG. 1 is shown in FIG. 4. In FIG. 4, the tappet 8 is retained against falling out of the cam disc 10 by a first spring 30 which is arranged parallel with the tappet 8 and a second spring 31 which is arranged parallel opposite the first spring 30. The second spring 31 is an identical component to the first spring 30. The components required for the arrangement of the second spring 31 are also identical to the components of the first spring 30, for which reason by way of example in FIG. 4 only the side of the electromechanical actuator 2 with the first spring 30 is shown. The first spring 30 is arranged at the tappet side via a first end stop 30a of the spring 30 and via a first receiving bearing 32 on the shaft 6 (FIG. 2) of the tappet 8. The second spring 31 is arranged at the tappet side via a second end stop 31a of the spring 31 and via a second receiving bearing 33 on the shaft 6 of the tappet 8. Centrally between the first spring 30 and the second spring 31, the tappet 8 is fixed to the shaft 6. The first receiving bearing 32 and the second receiving bearing 33 are movable, therefore not securely arranged on the shaft and compensate for a radial and/or axial movement of the tappet 8, initiated by a rotational movement of the cam disc 10. At the same time, the first spring 30 is retained axially at the side opposite the first receiving bearing 32 by a first spring retention element 34. The second spring 31 is in turn retained axially at the side opposite the second receiving bearing 33 by a second spring retention element 35. The first spring retention element 34 and the second spring retention element 35 are produced from a metal material. After the assembly of the first spring 30 on the first receiving bearing 32, the first spring retention element 34 is first positioned via a first tongue-and-groove connection 38 radially on the guide region 12 of the actuator housing 5 and subsequently axially fixed by a first screw connection 36 at the side of the first spring retention element 34 opposite the first tongue-and-groove connection 38 to the actuator housing 5 via a non-positive-locking and positive-locking connection. The assembly described for the first spring 30 also applies to the second spring 32. After the assembly of the second spring 31 on the second receiving bearing 33, the second spring retention element 35 is first radially positioned in the guide region 12 of the actuator housing 5 via a second tongue-and-groove connection 39 and subsequently axially fixed via a second screw connection 37 at the side of the second spring retention element 35 opposite the second tongue-and-groove connection 39 to the actuator housing 5 via a non-positive-locking and positive-locking connection.

LIST OF REFERENCE NUMERALS AS PART OF THE DESCRIPTION

1 Disc brake
2 Electromechanical actuator
3 Curved holding-down member
4, 4a Brake linings
5 Actuator housing
6 Shaft
7 Rotary lever
8 Tappet
8a Guide roller
8b Lever arm
10 Cam disc
11 Stop
12 Guide region
13 First inner wall of the guide region 12 of the actuator housing 5
13a Second inner wall of the guide region 12 of the actuator housing 5
14 Abutment face
15 Outer end of the cam disc 10
20 Spring; pressure spring
20a First end stop of the spring 20
20b Second end stop of the spring 20
21 Spring receiving member
21a Opening of the spring receiving member 21
30 First spring
31 Second spring
30a End stop of the first spring 30
31a End stop of the second spring 31
32 First receiving bearing
33 Second receiving bearing
34 First spring retention element 35 Second spring retention element
36 First screw connection
37 Second screw connection
38 First tongue-and-groove connection
39 Second tongue-and-groove connection
40 Brake carrier
41 Brake caliper
42, 42a Guide pin
44 Sliding chamfer of the tappet 8
45 Receiving member of the rotary lever 7
46 Brake disc
A Axial axis of the electromechanical actuator
A-A Section
L Gap
AS Tappet axis
D Rotational movement of the rotary lever 7
S Starting position

What is claimed is:

1. A disc brake (1) for vehicles, the disc brake comprising:
   two brake linings (4, 4a) and an electromechanical actuator (2) for applying the two brake linings to a brake disc (46) via a rotary lever (7),
   wherein the electromechanical actuator (2) comprises:
      an actuator housing (5),
      a cam disc (10) arranged in the actuator housing (5) on a shaft (6), and
      a tappet (8) cooperating with the cam disc (10),
   wherein the cam disc (10) has a stop (11) configured to fix the tappet (8) against the cam disc (10) in a starting position (S) of the rotary lever (7), along an axial axis (A) of the electromechanical actuator (2);
   wherein the stop (11) is a portion of the cam disc (10) and is arranged in contact with and adjacent an elongate lateral surface of the tappet (8) in the starting position (S), wherein the stop (11) moves away from the tappet (8) in response to rotation of the cam disc (10).

2. The disc brake (1) as claimed in claim 1, wherein the electromechanical actuator (2) has a gap (L) between a guide region (12) of the tappet (8) and a first inner wall (13) of the guide region (12) of the actuator housing (5),
   wherein the guide region guides the tappet (8) along the axial axis (A), and
   wherein the gap (L) is configured so that the tappet (8), starting from the initial position (S) of the rotary lever (7), is pivotable in a range between 0° and 5° about a tappet axis (AS).

3. The disc brake (1) as claimed in claim 1, wherein the stop (11) has an abutment face (14) extending radially with respect to the axial axis (A) toward the tappet (8),
   wherein the tappet (8), in the starting position (S), is in abutment with the abutment face (14),
   wherein the guide region (12) of the actuator housing (5) at an end face, with respect to the axial axis (A), has a second inner wall (13a), and
   wherein the tappet (8), in the starting position (S), is in abutment with the second inner wall (13a) of the guide region (12) of the actuator housing (5).

4. The disc brake (1) as claimed in claim 3, wherein the tappet (8) has a guide roller (8a) and a lever arm (8b) arranged axially toward the rotary lever (7) of the disc brake (1), and wherein the lever arm (8b), in the starting position (S), is radially in abutment with the abutment face (14).

5. The disc brake (1) as claimed in claim 1, wherein the cam disc (10) has a helical shape and wherein the stop (11) is arranged radially at an outer end (15) of the cam disc (10).

6. The disc brake (1) as claimed in claim 1, wherein the actuator housing (5) is an aluminum housing (5).

7. The disc brake (1) as claimed in claim 6, wherein the spring (20) is a pressure spring (20).

8. The disc brake (1) as claimed in claim 6, wherein the actuator housing (5) is an aluminum housing (5).

9. A disc brake (1) for vehicles, the disc brake comprising:
   two brake linings (4, 4a) and an electromechanical actuator (2) for applying the two brake linings to a brake disc (46) via a rotary lever (7),
   wherein the electromechanical actuator (2) comprises:
      an actuator housing (5),
      a cam disc (10) arranged in the actuator housing (5) on a shaft (6), and a tappet (8) cooperating with the cam disc (10),
   wherein a spring (20) surrounds the tappet (8), the spring (20) being axially arranged with a first end stop on the actuator housing (5), the spring (20) being axially arranged with a second end stop on the tappet (8) and the spring (20) fixes the tappet (8) axially and radially in a starting position (S) of the rotary lever (7), in which the tappet (8) extends parallel to an axial axis (a) of the electromechanical actuator,
   wherein the second end stop of the spring bears against the tappet in the axial direction, such that the spring is compressed axially in response to axial movement of the tappet.

10. The disc brake (1) as claimed in claim 9, wherein the actuator housing (5) has a spring receiving member (21) configured to support the first end stop (20a) of the spring (20) in an axial direction.

11. The disc brake (1) as claimed in claim 10, wherein the spring receiving member (21) is a spring plate (21) having an opening (21a), through which the tappet (8) extends.

12. A disc brake (1) for vehicles, the disc brake comprising:
   two brake linings (4, 4a) and an electromechanical actuator (2) for applying the two brake linings to a brake disc (46) via a rotary lever (7),
   wherein the electromechanical actuator (2) comprises:
      an actuator housing (5),
      a cam disc (10) arranged in the actuator housing (5) on a shaft (6), and
      a tappet (8) extending along an axial axis (A) and cooperating with the cam disc (10), wherein, tangentially along the tappet (8), a first spring (30) is arranged,
   wherein opposite the first spring (30), tangentially along the tappet (8), a second spring (31) is arranged,
   wherein the first spring (30) and the second spring (31) are configured to retain the tappet (8) axially and radially in a starting position (S) of the rotary lever (7).

13. The disc brake (1) as claimed in claim 12, wherein a guide roller (8a) of the tappet (8), with respect to the axial axis (A), has a first radial receiving bearing (32) for fixing an end stop (30a) of the first spring (30) and the guide roller (8a), with respect to the axial axis (A), has a second radial receiving bearing (33) for fixing an end stop (31a) of the second spring (31).

14. The disc brake (1) as claimed in claim 12, wherein the electromechanical actuator (2) has a first spring retention element (34) for receiving the end stop (30a) of the first spring (30) and the electromechanical actuator (2) has a second spring retention element (35) for receiving the end stop (31a) of the second spring (31).

15. The disc brake (1) as claimed in claim 14, wherein both the first spring retention element (34) and the second spring retention element (35) are radially fixed to a first inner wall (13) of a guide region (12) of the actuator housing (5).

16. The disc brake as claimed in claim 15, wherein the first spring retention element (34) is fixed by a first screw connection (36) and a first tongue-and-groove connection (38) to the first inner wall (13) of the guide region (12) of the actuator housing (5), and wherein the second spring retention element (35) is fixed by a second screw connection (37) and a second tongue-and-groove connection (39) to the first inner wall (13) of the guide region (12) of the actuator housing (5).

17. The disc brake (1) as claimed in claim 12, wherein the actuator housing (5) is an aluminum housing (5).

* * * * *